B. C. WILBURN.
FLOOD GATE ON STREAMS.
APPLICATION FILED APR. 30, 1920.
1,387,955.
Patented Aug. 16, 1921.
2 SHEETS—SHEET 2.
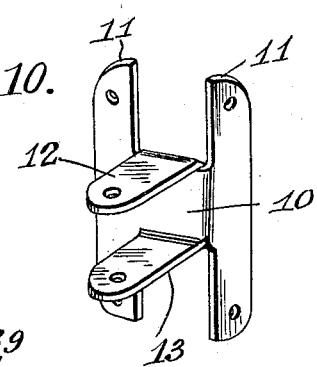
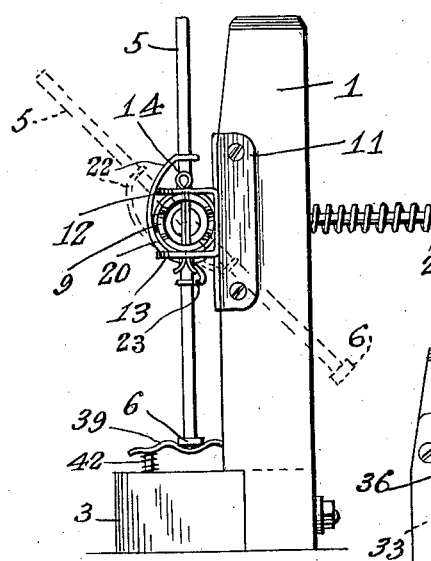
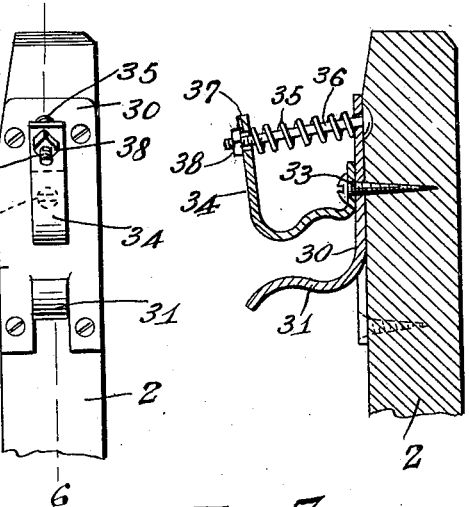
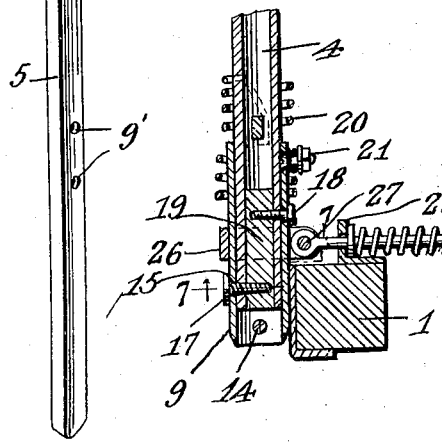
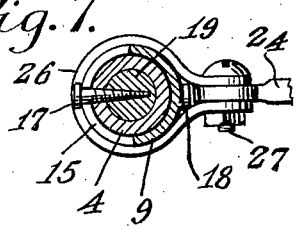
Inventor.
Byard Clemence Wilburn.

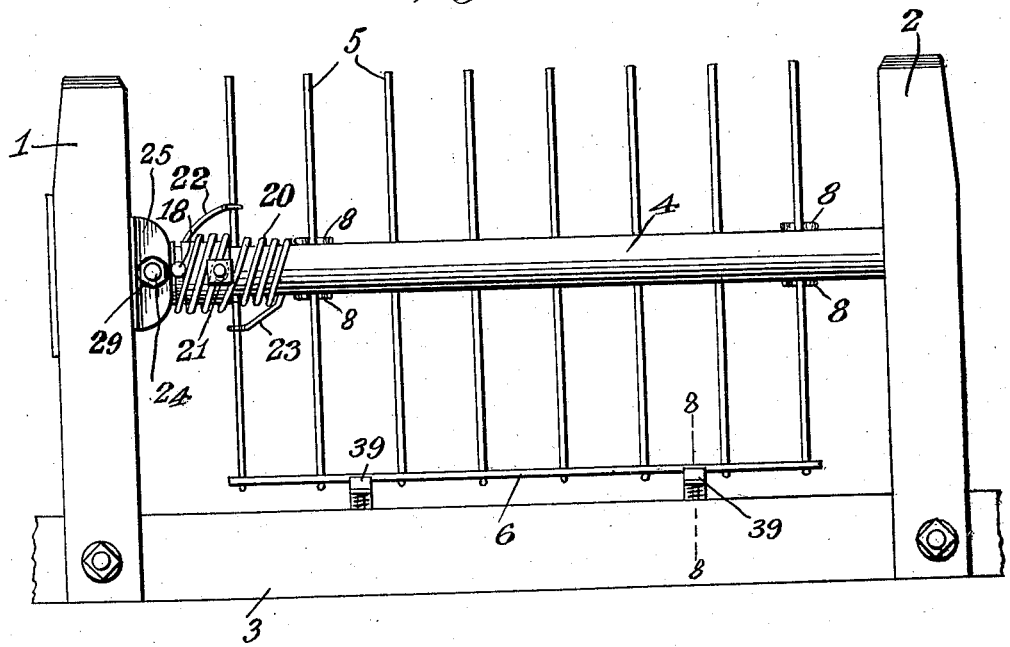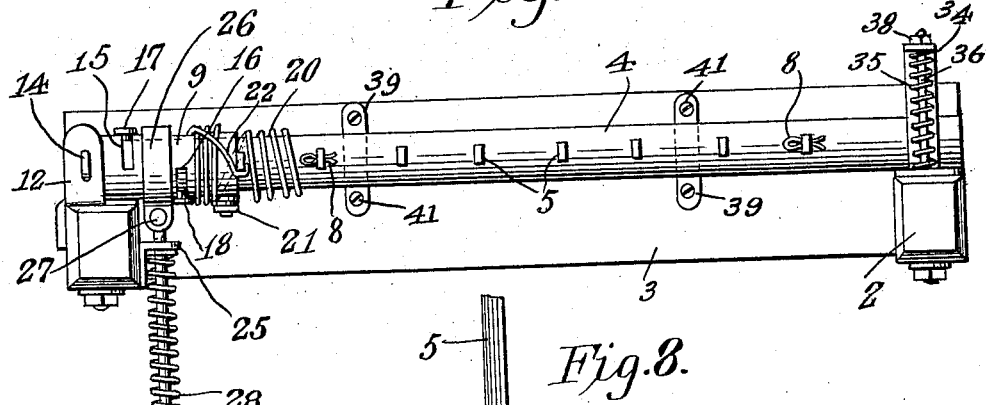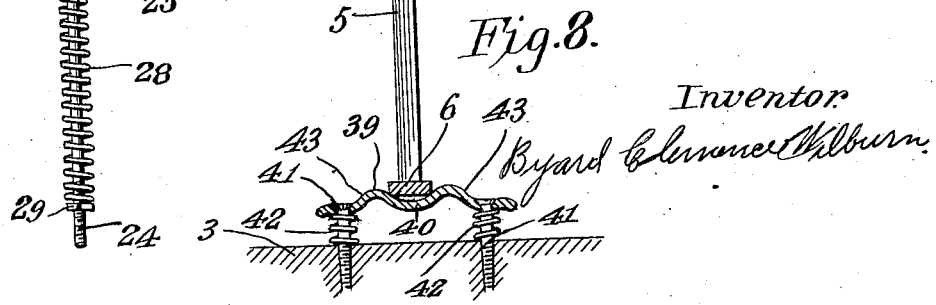

UNITED STATES PATENT OFFICE.

BYARD CLEMENCE WILBURN, OF APACHE, OKLAHOMA.

FLOOD-GATE ON STREAMS.

1,387,955.

Specification of Letters Patent.   Patented Aug. 16, 1921.

Application filed April 30, 1920. Serial No. 377,997.

*To all whom it may concern:*

Be it known that I, BYARD C. WILBURN, a citizen of the United States, residing at Apache, in the county of Caddo and State of Oklahoma, have invented new and useful Improvements in Flood-Gates on Streams, of which the following is a specification.

This invention relates to flood gates, and has for its object to provide a simple and improved device of this character which normally operates as a fence panel, and which is so constructed and arranged as to yield under the pressure of drift material on the surface of the stream in times of floods and high water, so as to permit the passage of the drift material without damage to the flood gate, the latter being mounted so that it will automatically return to its normal upright position after the drift material has escaped therefrom.

A further object of the invention is to enable the horizontal swinging of the gate upon a vertical axis in the manner of an ordinary farm gate, in order to enable the passage of vehicles, stock, etc., without in any manner interfering with or requiring any adjustment of the means permitting vertical tilting of the gate.

With these and other objects in view, the present invention consists in the combination and arrangement of parts, as will be hereinafter more fully described, shown in the accompanying drawings and particularly pointed out in the appended claims, it of course being understood that changes in the form, proportion, size and minor details may be made, within the scope of the claims, without departing from the spirit or sacrificing any of the advantages of the invention.

In the drawings:

Figure 1 is a side elevation of a flood gate embodying the features of the present invention;

Fig. 2 is a top plan view thereof;

Fig. 3 is an end view of the left hand end of Fig. 1;

Fig. 4 is a fragmentary plan section taken through the middle of the left hand end of the gate;

Fig. 5 is a front elevation of the latch for the right hand end of the gate;

Fig. 6 is a sectional view on the line 6—6 of Fig. 5;

Fig. 7 is an enlarged detail vertical sectional view on the line 7—7 of Fig. 4;

Fig. 8 is an enlarged sectional view on the line 8—8 of Fig. 1;

Fig. 9 is a detail perspective view of one of the upright bars or pickets of the gate;

Fig. 10 is a detail perspective view of the mounting bracket for the left hand end of the gate.

For the mounting of the present gate there are spaced gate posts 1 and 2 which, as shown in the accompanying drawings, are connected at their bottoms by a sill member 3 to which the posts are rigidly connected in any suitable manner.

The gate proper includes a rock bar 4, preferably a metal tube of suitable dimensions, and through this rock bar extends a plurality of upright pickets or gate bars 5, the lower ends of which are connected by a bottom bar 6. Each picket 5 is provided at its lower end with a terminal hook 7, which is engaged with an opening in the bottom bar 6 so as to serve as a connection therewith. Suitable means are employed for holding each picket or gate bar against endwise displacement through the rock bar 4, such, for instance, as cotter pins 8 extending through perforations 9' in the picket just above and below the rock bar 4.

One end of the rock bar 4 is rotatably received within a bearing member 9 in the form of an open ended tube, and this tube is rigidly carried by a bracket 10 having upright flanges 11 disposed at substantially right angles to one another so as to embrace adjacent sides of the post 1 to which they are connected in any suitable manner. Upper and lower spaced members 12 and 13 extend outwardly from the bracket and lie across the top and bottom of the bearing member 9, there being a suitable fastening 14, such as a cotter pin extending downwardly through the bracket members 12 and 13 and the bearing 9 just beyond the adjacent extremity of the rock bar 4, whereby the bearing member 9 is held against axial rotation within the bracket. The bearing 9 is provided in opposite sides with transverse slots 15 and 16 through which extend headed pins 17 and 18 which also enter the tubular rock bar 4 and engage a wooden plug 19 within the rock bar. By this arrangement, the rock bar 4 is held against endwise movement and displacement in the bearing 9 while at the same time the bar is permitted to rotate upon its axis within the bearing, the ends of the slots 15 and 16 constituting stops for engagement by the pins 17 and 18 to limit the rotating movements of the rock bar 4.

For the purpose of maintaining the gate pickets 15 normally in an upright position there is provided a helical spring 20 which loosely embraces the rock bar 4 and the inner end of the bearing member 9. An intermediate portion of the spring is secured to the bearing 9 by a suitable fastening 21. The opposite ends 22 and 23 of the spring are suitably engaged with the adjacent picket 5. By this arrangement the gate can rock on its horizontal axis 4 against the tension of the spring arms 22 and 23, which latter will operate to return the gate to its normal upright position.

While the pin 14 holds the bearing member 9 against axial rotation within the bracket arms 12 and 13, the gate can swing horizontally upon the pin 14 as an axis, whereby said pin constitutes a hinge pintle so as to enable the opening and closing of the gate in the manner of an ordinary farm gate whenever desired.

For the purpose of maintaining the gate normally closed, there is a spring actuated plunger rod 24 which works endwise through a bracket 25 provided upon the gate post 1, and has its inner end connected to a collar 26 embracing the bearing 9 between the pins 17 and 18, and to which collar the plunger rod 25 is pivotally connected by an upright pivot pin 27. A suitable spring 28 embraces the plunger rod with one end bearing against the bracket 25 and its other end bearing against a nut 29 mounted upon the outer extremity of the plunger rod 24 and constituting an adjustable abutment for regulating the tension of the spring. When the gate is swung open in a horizontal direction, the head or abutment 29 moves forwardly and compresses the spring 28, so that when the gate is released the spring 28 will automatically return the gate to its normal closed position. The plunger rod 24 has sufficient looseness through the opening in the bracket 25 to permit of whatever lateral play may be necessary, and the vertical pivot pin 27 permits of whatever angular movement may be necessary between the part 26 and the plunger rod 24.

Suitable latching means is provided for the free end of the gate and, as best shown in Figs. 5 and 6, it will be seen that this latch includes a plate or body 30 suitably secured to the front side of the post 2 and provided with a substantially horizontal jaw 31 bent from the plate 39. Above the jaw 31 is another and coöperating spring jaw 32, one end of which is secured to the plate or bracket 30 by a suitable fastening 33. The outer free end of the upper spring jaw extends upwardly as at 34, and a suitable compression spring 35 is interposed between the upper free end portion 34 of the jaw 32 and the upper part of the latch bracket 30. A guide rod 36 extends outwardly from the bracket, is received loosely through an opening 37 in the free extremity of the spring jaw 32, and is provided at its outer end with a nut 38 bearing against the front or outer side of the jaw terminal 34. The jaws 31 and 32 are spaced so as to receive the free end of the rock bar 4 connected between said jaws in the normal closed position of the gate, the jaws being arcuate in shape so as to embrace the top and bottom of the cylindrical bar 4 and thereby constitute a bearing within which said rock bar may rock or oscillate when the gate yields to the pressure of drift material upon the surface of the water.

To normally maintain the gate rigid in an upright position, I provide two latches coöperating with the bottom bar of the gate. Each latch includes a substantially horizontal member or plate 39 provided with an intermediate recess or seat 40 to receive the bottom bar 6 of the gate. Each end of the latch member is mounted to work vertically upon a headed fastening 41 passing through an opening in the latch member and secured to the sill member 3. Two coiled springs 42 are interposed between the sill 3 and the latch member and surround the respective fastenings 41 so as to yieldably maintain the latch member in engagement with the bottom bar of the gate. At each side of the seat or depressed portion 40 the latch is provided with beveled or inclined portions 43 leading upwardly and inwardly to the seat 40 so that the lower bar 6 of the gate may wipe over one of these inclined portions and thereby depress the latch sufficiently to allow the gate to pass across the high point on the latch member, which will thereafter snap upwardly into snug engagement with the bottom bar of the gate.

With the gate in the position shown in Figs. 1 and 2 and in the event of a flood or very high water, drift material carried against the top of the gate will tilt the same into the general position shown in dotted lines in Fig. 3, whereby the drift material will be permitted to escape over the top of the gate and the latter will resume its normal position under the influence of the spring 20. The latches 39 will of course permit such tilting of the gate but will maintain the gate in its upright position under normal conditions.

The gate may be swung open horizontally, so as to permit the passage of stock, vehicles and the like by pushing or pulling upon the gate so as to move the right hand end thereof out from between the latch jaws 31 and 32 on the gate post 2, whereupon the gate may be swung open upon the hinge pintle 14. When released, the gate will be returned to its normal closed position under the influence of the spring 28.

What I claim is:

1. In a combined flood gate and farm gate, the combination of a gate post, a horizontally disposed bearing mounted to swing horizontally upon the post, a vertically tiltable gate frame having a pivot portion mounted to rock in the bearing and to swing horizontally therewith, and a spring carried by the bearing and associated with the gate frame to yieldably maintain the latter in a vertical position.

2. In a combined flood gate and farm gate, the combination of a gate post, a horizontally disposed bearing mounted to swing horizontally upon the post, a gate frame having a pivot portion mounted to rock in the bearing and to swing horizontally therewith, a collar loosely embracing the bearing, a bracket on the post, and a spring pressed plunger rod working endwise through the bracket and pivotally connected to the collar to yieldably maintain the gate closed.

3. In a combined flood gate and farm gate, the combination of a gate post, a horizontally disposed bearing mounted to swing horizontally upon the post, a gate frame having a pivot portion mounted to rock in the bearing and to swing horizontally therewith, the bearing having a transverse slot therein, and a projection carried by the pivot and working in the slot.

4. In a combined flood gate and farm gate, the combination of a gate post, a horizontally disposed bearing mounted to swing horizontally upon the post and provided with a pair of spaced transverse slots, a gate frame having a pivot portion mounted to rock in the bearing and to swing horizontally therewith, projections carried by the pivot and working in the respective slots in the bearing, a collar loosely embracing the bearing and disposed between the slots, and a spring pressed plunger mounted upon the post and associated with the collar to maintain the gate normally closed.

BYARD CLEMENCE WILBURN.

Witnesses:
 CHAS. M. SMITH,
 JAS. M. BOHART.